(12) United States Patent
Maemura et al.

(10) Patent No.: US 9,132,804 B2
(45) Date of Patent: Sep. 15, 2015

(54) SEATBELT DEVICE

(75) Inventors: Eiji Maemura, Yokohama (JP); Hiroko Yoshikawa, Yokohama (JP); Yukinori Midorikawa, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 808 days.

(21) Appl. No.: 13/394,702

(22) PCT Filed: Sep. 1, 2010

(86) PCT No.: PCT/JP2010/064922
§ 371 (c)(1),
(2), (4) Date: Mar. 7, 2012

(87) PCT Pub. No.: WO2011/027779
PCT Pub. Date: Mar. 10, 2011

(65) Prior Publication Data
US 2012/0168548 A1 Jul. 5, 2012

(30) Foreign Application Priority Data

Sep. 7, 2009 (JP) ................................. 2009-206162
Sep. 10, 2009 (JP) ................................. 2009-209172

(51) Int. Cl.
*B60R 22/46* (2006.01)
(52) U.S. Cl.
CPC ....... *B60R 22/4628* (2013.01); *B60R 2022/468* (2013.01); *B60R 2022/4642* (2013.01)
(58) Field of Classification Search
USPC ............................................. 242/374, 382.2
See application file for complete search history.

(56) References Cited

U.S. PATENT DOCUMENTS

| 4,944,379 A * | 7/1990 | Haaser ........................ 192/150 |
| 2003/0122020 A1* | 7/2003 | Tanji ............................. 242/374 |
| 2004/0182963 A1* | 9/2004 | Mori et al. .................... 242/374 |
| 2008/0290203 A1* | 11/2008 | Kohlndorfer et al. ......... 242/374 |
| 2009/0294565 A1* | 12/2009 | Ouchi et al. ................ 242/390.2 |
| 2011/0101145 A1* | 5/2011 | Maemura et al. .......... 242/390.8 |

FOREIGN PATENT DOCUMENTS

| WO | WO 2006/123750 | 11/2006 |
| WO | WO 2006123750 A1 * | 11/2006 |
| WO | WO 2008/149746 | 12/2008 |

OTHER PUBLICATIONS

International Search Report of PCT/JP2010/064922 Mailed on Sep. 28, 2010, 2 pages.

* cited by examiner

*Primary Examiner* — Emmanuel M Marcelo
*Assistant Examiner* — Angela Caligiuri
(74) *Attorney, Agent, or Firm* — Brinks Gilson & Lione

(57) ABSTRACT

A seatbelt device for preventing a torque limiter mechanism from operating due to inertia force when a gear rotates quickly due to a winding force of an electric actuator, while maintaining satisfactory operating characteristics of the torque limiter mechanism. In the torque limiter mechanism, when a motor is driven to perform a wind-up operation, a prescribed operational torque that is set as a torque at which a limit spring moves from an engaging surface where the limit spring is positioned when a large-diameter side gear and a small-diameter side gear are in an assembled state, to an adjacent engaging surface, is greater than an operational torque at which the limit spring moves from the adjacent engaging surface to a next adjacent engaging surface by means of a shear pin.

4 Claims, 12 Drawing Sheets

SEATBELT DEVICE

BACKGROUND

1. Field of the Invention

The present invention relates to a seatbelt device, and more particularly, to a seatbelt device comprising an electrical actuator.

2. Description of Related Technology

In a conventional seatbelt device, if there is a possibility of a collision, the seatbelt (webbing) is wound up by an electrical actuator before the collision, thereby lightly restraining the occupant, and when there is no longer a possibility of collision, the seatbelt is returned to the state before collision. In the event of a collision, the restraining force is increased by a pre-tensioner, thereby reliably protecting the occupant (see, for example, Japanese Patent Application Publication No. 2005-88838.)

Furthermore, in Japanese Patent Application Publication No. 2005-88838, a torque limiter mechanism is provided in a power transmission mechanism which transmits motive power from a motor (electrical actuator) to a spindle, in order to restrict the transmission of excessive torque by the motor when the motor is driven to perform a wind-up operation.

Therefore, the operational torque of the torque limiter mechanism is set lower than the gear strength and higher than the winding force of the motor. However, if the motor is operated from a state including slack, for example, and the seatbelt is pulled out violently, or the winding action is locked, then a winding force equal to or greater than the setting may be generated momentarily due to the inertia force of the gearbox itself, including the motor, and hence the torque limiter mechanism may operate. Operation of this kind can be resolved by increasing the operational torque overall, but this affects the operating characteristics of the torque limiter mechanism.

SUMMARY OF THE INVENTION

The present invention was devised in view of these circumstances, an object thereof being to provide a seatbelt device which is capable of preventing a torque limiter mechanism from operating due to inertia force, in cases where a gear turns rapidly due to the winding force of an electric actuator, while maintaining good operating characteristics of the torque limiter mechanism.

The principles of the present invention are achieved in one embodiment by means of the following construction.

A seatbelt device comprising: a spindle that winds up a seatbelt; an electrical actuator that generates motive power for rotating the spindle; and a power transmission mechanism configured to transmit motive power from the electrical actuator to the spindle, wherein the power transmission mechanism includes: an actuator side gear to which motive power from the electrical actuator is transmitted; a spindle side gear provided on the spindle side; and elastic pieces that are installed on one of the actuator side gear and the spindle side gear, a wall surface having a plurality of engaging surfaces configured to engage the elastic pieces being formed on the other of the actuator side gear and the spindle side gear, a torque limiter mechanism is provided whereby, when a torque differential greater than a prescribed operational torque has occurred between the actuator side gear and the spindle side gear, the elastic pieces disengage from the engaging surfaces and move relatively with respect to the other gear such that the torque differential becomes equal to or lower than the prescribed operational torque, and when the electrical actuator is driven to perform a wind-up operation, the prescribed operational torque, that is set as a torque at which each of the elastic pieces moves from the engaging surface where the elastic piece is positioned when the actuator side gear and the spindle side gear are in an assembled state to an adjacent engaging surface, is greater than an operational torque at which the elastic piece moves from the adjacent engaging surface to a next adjacent engaging surface.

In another aspect of the invention, a shearing member is provided in the actuator side gear or the spindle side gear, and the prescribed operational torque, which is set as the torque at which the elastic piece moves from the engaging surface where the elastic piece is positioned in the assembled state to the adjacent engaging surface, includes a shearing force at which the shearing member is sheared when the actuator side gear and the spindle side gear move relatively with respect to each other.

In a further aspect of the invention, an elastic piece holder for installing the elastic pieces is fixed to one of the actuator side gear and the spindle side gear, and the shearing member is provided on the elastic piece holder and is accommodated in a hole formed in the other gear.

In yet another aspect of the invention, a plurality of projecting sections are formed between the plurality of engaging surfaces, on the wall surface of the other gear, and of the plurality of projecting sections, the projecting section that is positioned between the engaging surface where the elastic piece is positioned in the assembled state and the adjacent engaging surface is higher than the projecting section that is positioned between the adjacent engaging surface and the next adjacent engaging surface.

According to another aspect of the seatbelt device of the present invention, the power transmission mechanism includes: an actuator side gear to which motive power from the electrical actuator is transmitted; a spindle side gear provided on the spindle side; and an elastic piece that is installed on one of the actuator side gear and the spindle side gear. A wall surface having a plurality of engaging surfaces capable of engaging the elastic pieces is formed on the other of the actuator side gear and the spindle side gear. The drive transmission mechanism also includes a torque limiter mechanism whereby, when a torque differential greater than a prescribed operational torque has occurred between the actuator side gear and the spindle side gear, the elastic pieces disengage from the engaging surfaces and move relatively with respect to the other gear such that the torque differential becomes equal to or lower than the prescribed operational torque. In this torque limiter mechanism, when the electrical actuator is driven to perform a wind-up operation, the prescribed operational torque that is set as a torque at which each of the elastic pieces moves from the engaging surface where the elastic piece is positioned when the actuator side gear and the spindle side gear are in an assembled state to an adjacent engaging surface, is greater than an operational torque at which the elastic piece moves from the adjacent engaging surface to a next adjacent engaging surface. By this means, it is possible to prevent the torque limiter mechanism from operating due to inertia force when the gear rotates rapidly due to a wind-up force from the electrical actuator, while maintaining good operating characteristics of the torque limiter mechanism.

DETAILED DESCRIPTION

Below, various embodiments of seatbelt devices in accordance with the principles of the present invention are described in detail with reference to the drawings.

Figure 1:
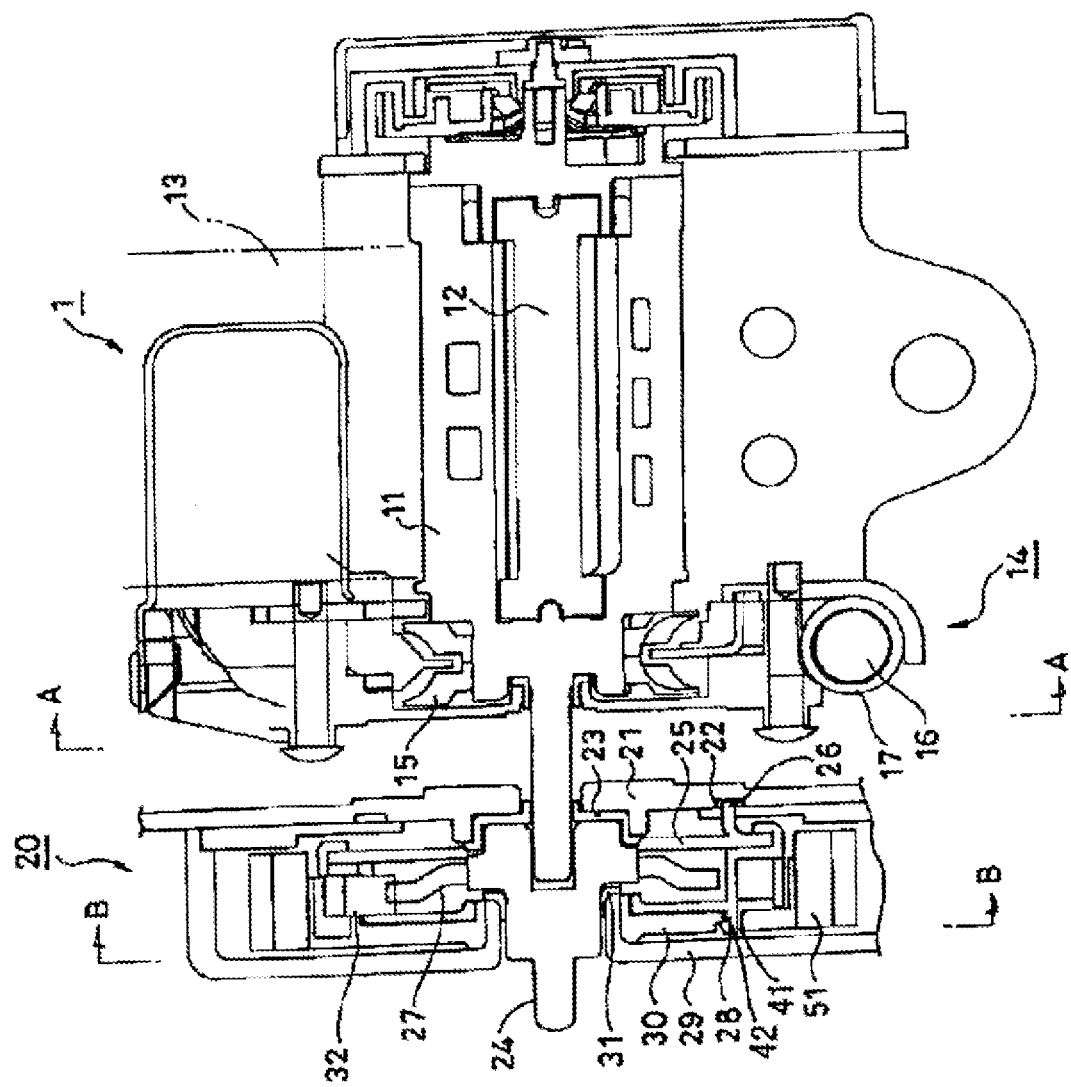
FIG. 1 is a schematic vertical cross-sectional diagram of a seatbelt device according to a first embodiment according to the principles of the present invention.
Figure 2:
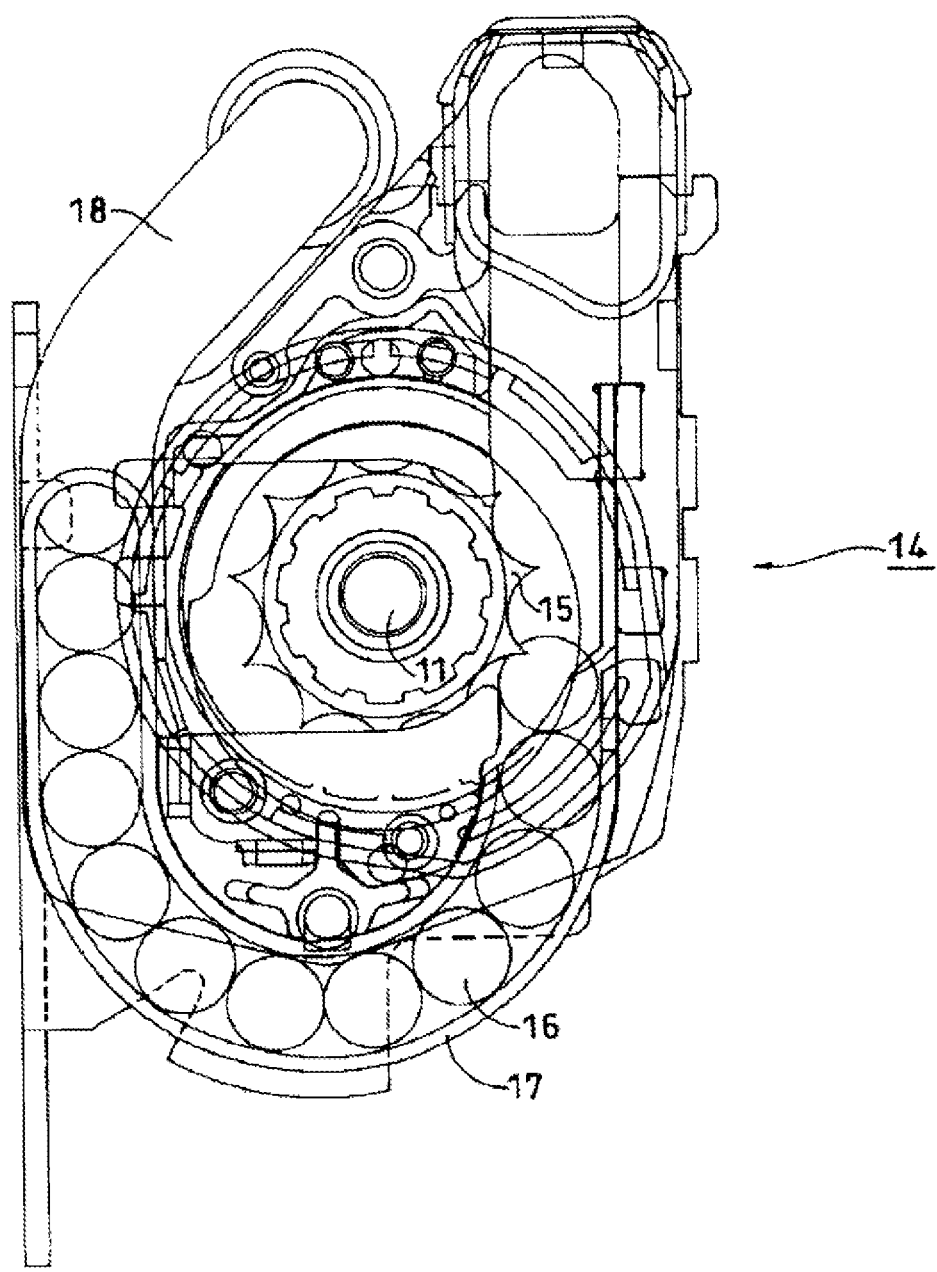
FIG. 2 is a partial cutaway diagram generally taken along line AA in FIG. 1.
Figure 3:
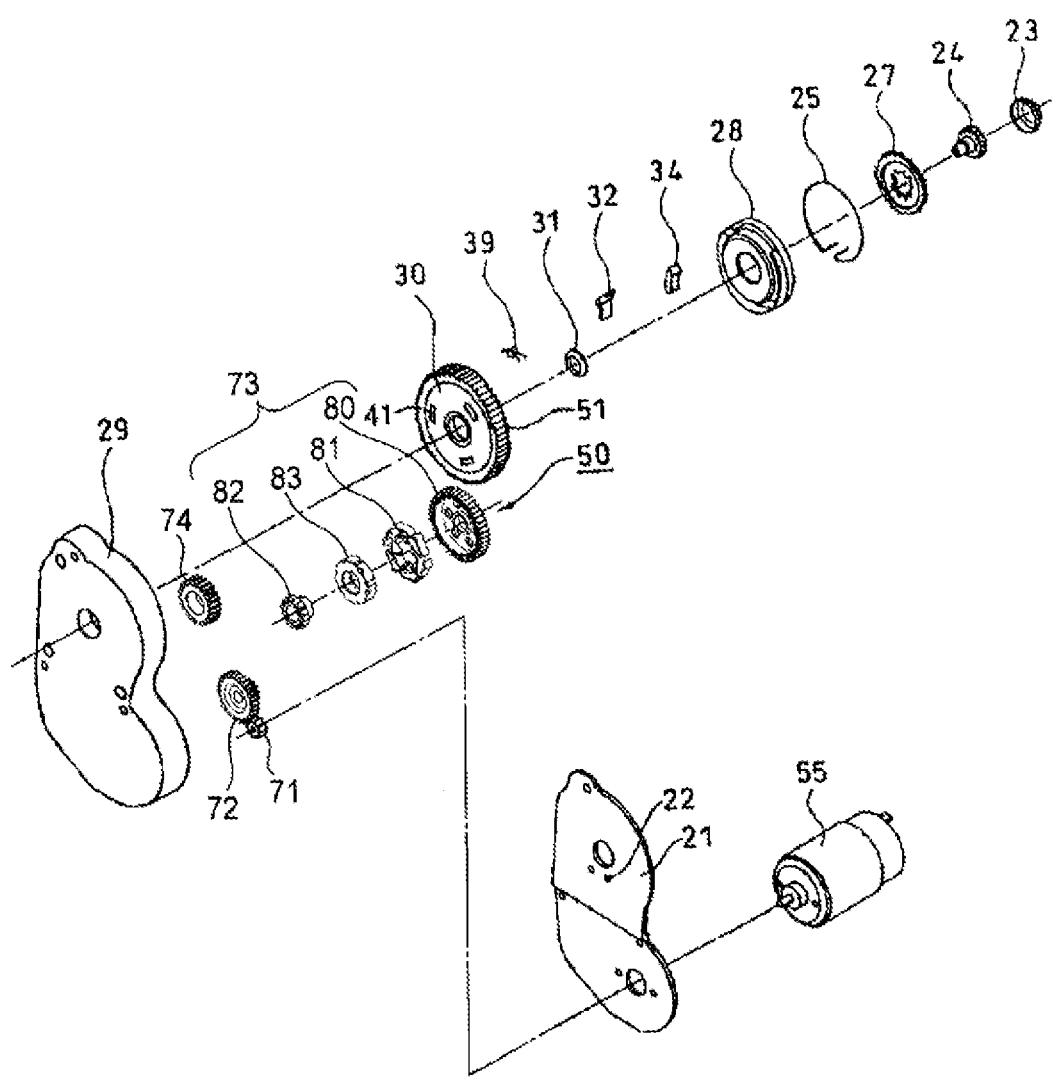
FIG. 3 is an exploded schematic perspective diagram of a clutch that transmits motive power from a motor in a seatbelt device according to a first embodiment.

As shown in FIG. 1 to FIG. 3, the seatbelt device 1 according to a first embodiment includes a spindle 11 that winds up a seat belt (webbing) 13, an ignition type actuator (pre-tensioner) 14 that is connected to the spindle 11, a motor 55 that is an electrical actuator, and a clutch 20 that is a power transmission mechanism that transmits motive power from the motor 55 to the spindle 11. A torsion bar 12 forming an energy absorbing mechanism is provided inside the spindle 11 and is connected to the spindle 11.

The pre-tensioner 14 includes a pinion 15 connected to the spindle 11; a tube 17 that accommodates a set of balls 16; and a gas generating device 18 that is provided on one end of the tube 17. When the gas generating medium is ignited, gas is produced by the gas generating device 18 and the set of balls 16 inside the tube 17 is pushed out strongly. The set of balls 16 that have been pushed out move along a groove in the pinion 15, and cause the spindle 11 to rotate.

The motor 55 is connected to a gear assembly 50, and the rotation of the motor 55 is reduced by the gear assembly 50. The gear assembly 50 and the clutch 20, which is described below, are accommodated inside a vessel that is constituted by a lower side cover 21 and an upper side cover 29.

Figure 4:
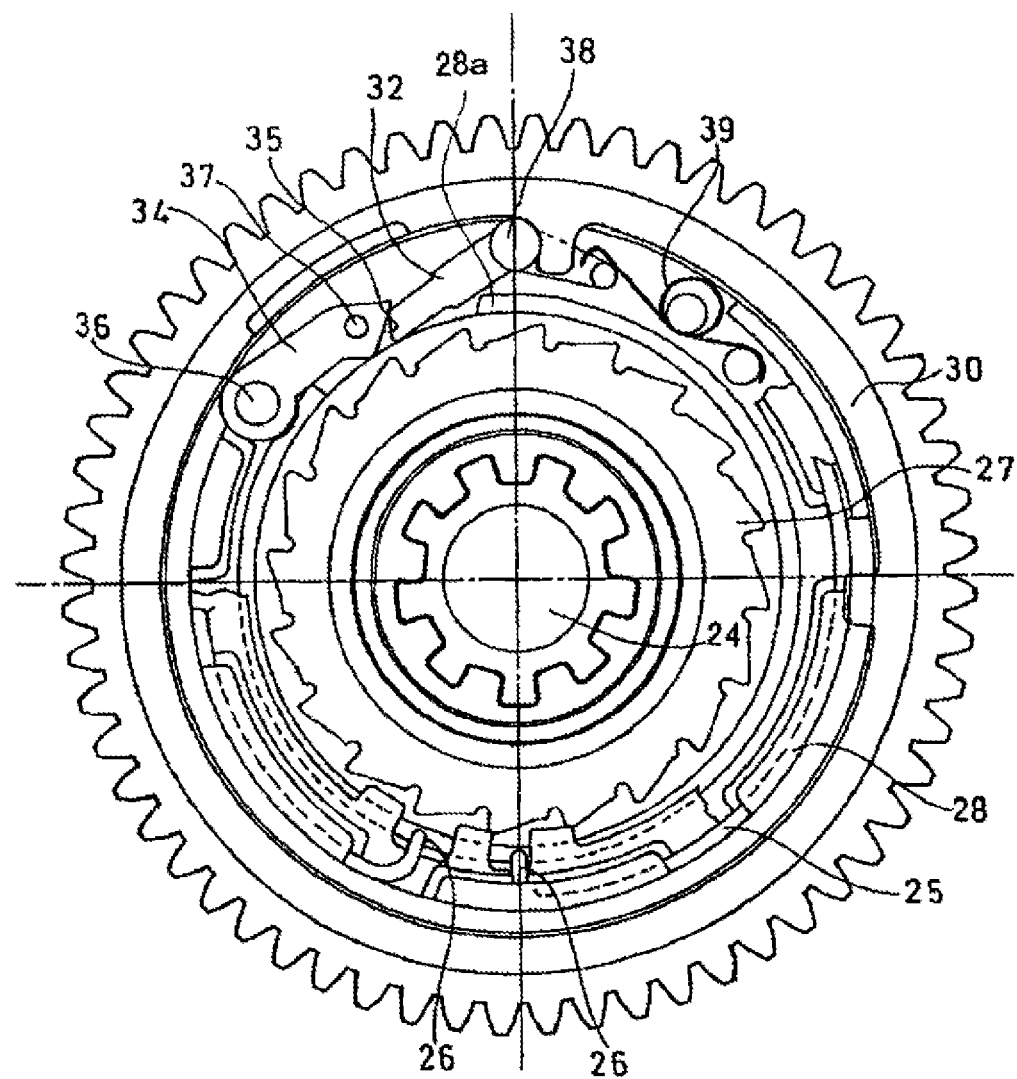
FIG. 4 is a vertical cross-section generally taken along line BB in FIG. 1, and shows operation of the clutch that transmits motive power from the motor.

As shown in FIG. 3 and FIG. 4, the clutch 20 includes a joint 24, a latch plate (ratchet wheel) 27, a final gear 51 of the gear assembly 50, a pole 32, a return spring 39 which is an impelling member, a guide ring 30, a clutch wheel 28, a rotor cam 34, a friction spring 25, and bushes 23, 31. The joint 24 is connected to the spindle 11 and the latch plate 27 is unified with the joint 24 and rotates together with the spindle 11. The final gear 51 is coupled to the rotational axle of the motor 55.

The pole 32 is installed rotatably about an axle 38 on the final gear 51, and is able to mesh with the teeth of the latch plate 27. The return spring 39 is impelled in a direction which releases the pole 32 from the latch plate 27. The guide ring 30 is provided in a unified fashion with the final gear 51, on the inside the final gear 51, and the clutch wheel 28 has three foot sections 42 which respectively engage with three holes 41 of the guide ring 30 in relatively rotatable fashion through a required angle. The rotor cam 34 is installed rotatably about an axle 36 on the clutch wheel 28, and is also fixed and installed on the clutch wheel 28 by a fixing pin 37; the rotor cam 34 is prohibited from rotating when fixed to the clutch wheel 28 by the fixing pin 37 and becomes able to rotate by rupture of the fixing pin 37. An end portion 26 of the friction spring 25 is fitted into the recess section 22 of the lower side cover 21 and is installed on the lower side cover 21, and is connected to the clutch wheel 28 by frictional sliding. One end of the pole 32 moves along the cam surface 35 of the rotor cam 34.

The clutch wheel 28 is formed with a rib 28a at a prescribed position spanning in the circumferential direction, one end portion of the rib 28a being disposed in the vicinity of the pole 32 when in a non-operational state where winding up by the motor 55 is not being performed. When the motor 55 is not operating, if the pole 32 is rotated by a violent vibration of the vehicle, or the like, then the rib 28a abuts against the pole 32 and prevents the pole 32 from rotating inadvertently in a direction to engage with the latch plate 27.

Figure 9:
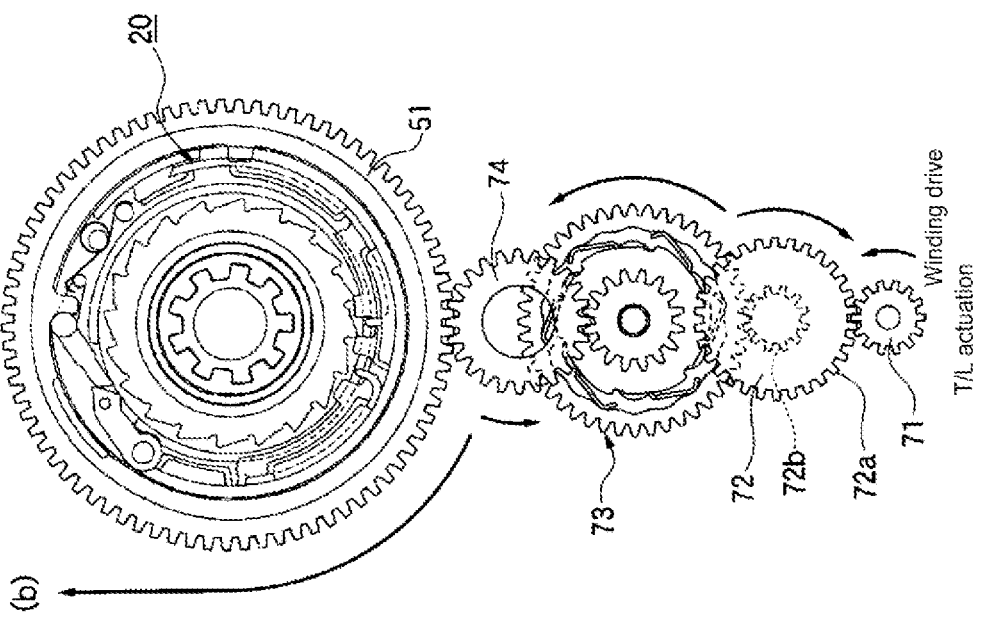
FIGS. 9(a) and 9(b) are diagrams generally illustrating a torque limiter mechanism according to a first embodiment.
Figure 9:
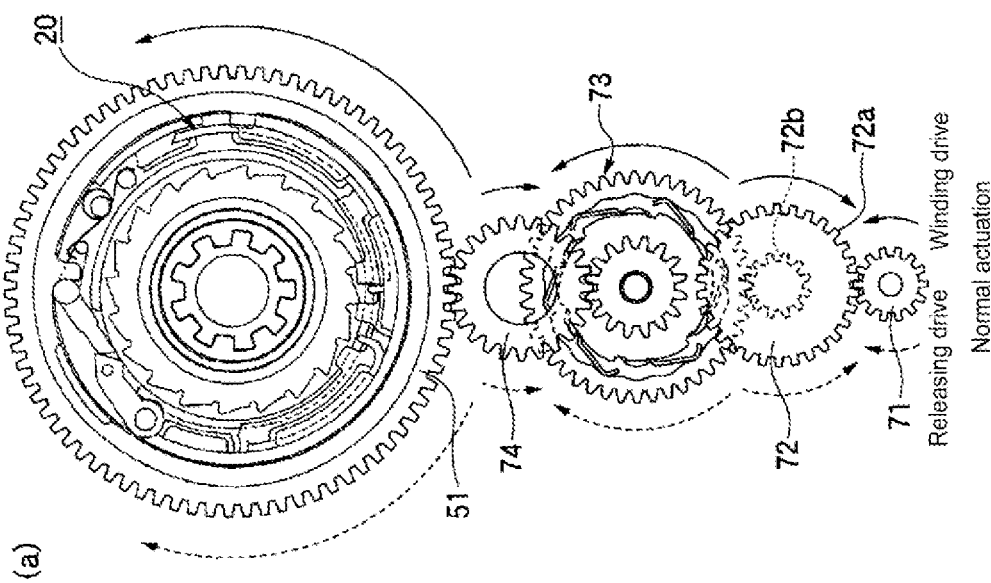
Figure 10:
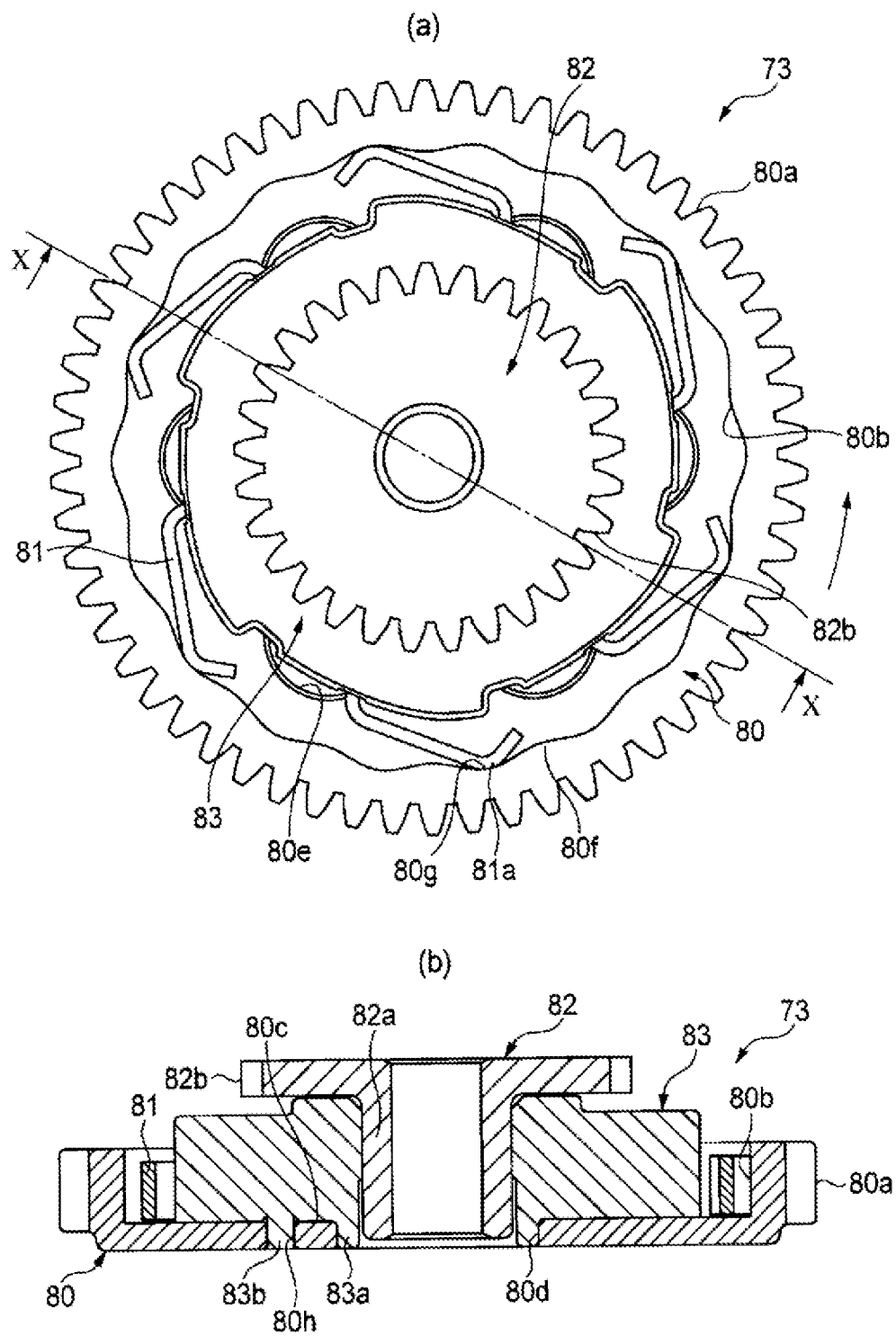
FIGS. 10(a) and 10(b) are diagrams generally illustrating a gear assembly having a torque limiter mechanism.

As shown in FIG. 9(a) and FIG. 9(b), the gear assembly 50 according to the present embodiment includes first to fourth gears 71, 72, 73, 74, and the tooth surfaces of the fourth gear 74 mesh with the final gear 51. The first gear 71 is coupled to the motor shaft of the motor 55, and the second gear 72 has two tooth surfaces 72a, 72b which respectively mesh with the first gear 71 and the third gear 73. As shown in FIG. 10, the third gear 73 is a gear assembly equipped with a torque limiting mechanism that includes a large-diameter side gear (actuator side gear) 80 in the form of a bottomless circular tube, a plurality of limit springs (elastic pieces) 81, a tubular small-diameter side gear (spindle side gear) 82, and a spring holder (elastic piece holder) 83.

The small-diameter side gear 82 has a gear portion 82b, which meshes with the fourth gear 74, in a flange portion that is provided in one end portion of the hollow axle section 82a. The spring holder 83 is fitted externally onto and fixed to the axle section 82a of the small-diameter side gear 82, so as to be rotatable in unison therewith, and holds the base portions of a plurality of limit springs 81. The small-diameter side gear 82 and the spring holder 83 may be formed in an integrated fashion. Furthermore, the large-diameter side gear 80 is arranged coaxially with the small-diameter side gear 82 and has a tooth section 80a, which meshes with the second gear 72 on the outer circumferential surface thereof, and the spring holder 83 and the limit springs 81 are accommodated by the inner walls 80b and the bottom section 80c which are coated with grease. A central hole 80d which guides a circular tube section 83a of the spring holder 83 is formed in a centre of the bottom section 80c of the large-diameter side gear 80, and furthermore, a plurality of cutaway holes 80e for reducing the weight are formed in the perimeter of the central hole 80d.

The inner wall (wall surface) 80b of the large-diameter side gear 80 is formed in an undulating shape and has a plurality of projecting sections 80f provided at prescribed intervals apart, and a plurality of recess-shaped engaging surfaces 80g provided between the plurality of projecting sections 80f; protruding sections 81a formed on each of the limit springs 81 engage with the engaging surfaces 80g. The projecting sections 80f and the engaging surfaces 80g are respectively formed in a number which is an integral multiple (eighteen in the present embodiment) of the number of limit springs 81 (six in the present embodiment).

Furthermore, at least one shear pin (shearing member) 83b is formed to project toward the bottom section 80c of the large-diameter side gear 80, in the surface of the spring holder 83 on the round tubular section 83a side thereof. The shear pin 83b may be formed in a unified fashion with the spring holder 83, or may be embedded as a separate member. The shear pin 83b is accommodated in a hole section 80h which is formed at a position where there is no cutaway hole 80e in the bottom section 80c of the large-diameter side gear 80. Consequently, the parts are assembled in such a manner that, when the shear pin 83b of the spring holder 83 is accommodated in the hole section 80h of the large-diameter side gear 80, the protruding sections 81a of each limit spring 81 are positioned at the respective engaging surfaces 80g of the large-diameter side gear 80.

Figure 11:
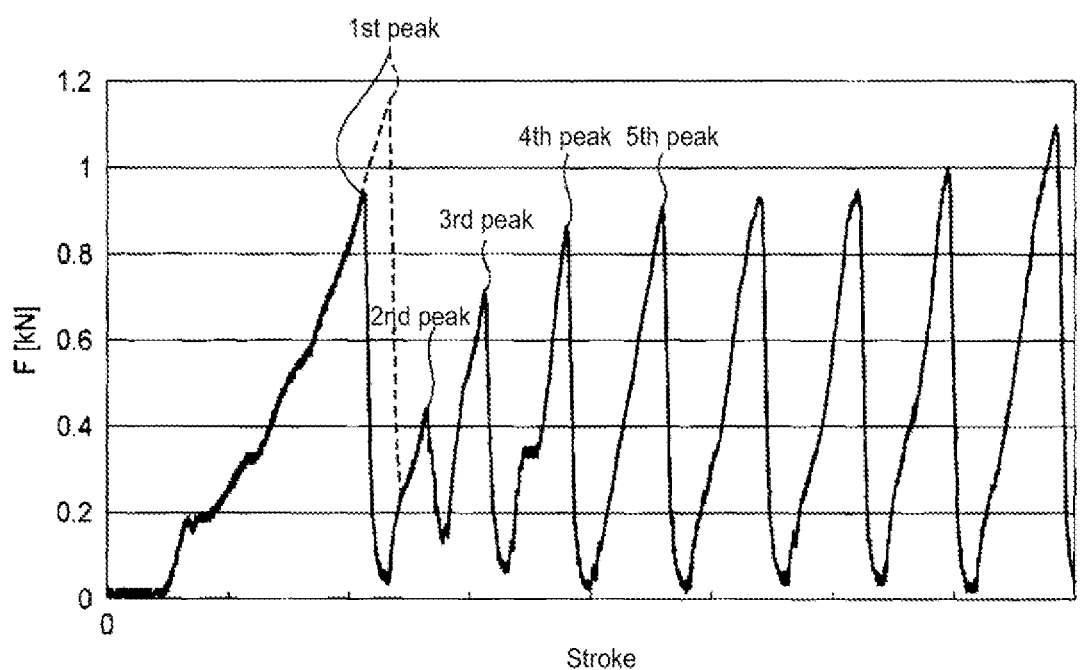
FIG. 11 is a graph showing a belt tension waveform when a torque limiter mechanism is operated.

Here, when the large-diameter side gear 80 and the small-diameter side gear 82 move relatively with respect to each other, the protruding sections 81a of the limit springs 81 ride up over the projecting sections 80f in moving from one engaging surface 80g to the adjacent engaging surface 80g, thereby absorbing the torque (the solid-lined portion of the belt tension graph in FIG. 11). Moreover, in the present embodiment, when the large-diameter side gear 80 rotates in the direction of the arrow in FIG. 10A with respect to the limit springs 81, and the limit springs 81 are moved from one engaging surface 80g to the adjacent engaging surface 80g in a state where the large-diameter side gear 80 and the small-diameter side gear 82 are assembled together, then it is necessary to shear the shear pin 83b, and hence the shearing force for shearing the shear pin 83b (the dotted-line portion of the belt tension graph in FIG. 11) is added to the operational torque of the torque limiter mechanism.

Consequently, if the motor 55 is operated from a state including slack, for example, and the seatbelt is pulled out violently, or the winding action is locked, then a winding force equal to or greater than the setting may be generated momentarily due to the inertia force of the gearbox itself, including the motor 55, but it is possible to prevent the operation of the torque limiter mechanism by means of the shear pin 83b receiving this winding force.

Next, the operation of the seatbelt device 1 according to the present embodiment will be described.

When there is a possibility of collision, the seatbelt 13 is wound up by the motor 55 before collision, and the seatbelt is returned to the state before collision when there is no longer a possibility of collision. In the event that a collision occurs, the seatbelt 13 is wound up at a speed greater than the winding speed produced by the motor 55 before collision, by means of the pre-tensioner 14, and the tension is limited by the tension bar 12 when a prescribed tension or more is applied to the seatbelt 13.

Next, the operation of the clutch 20 will be described.

Firstly, as shown in FIG. 4, when winding by the motor 55 is not being performed, the latch plate 27 and the pole 32 are not engaged. The latch plate 27 only rotates in unison with the spindle 11, and the seatbelt 13 is wound up and pulled out in a normal fashion.

Figure 5:
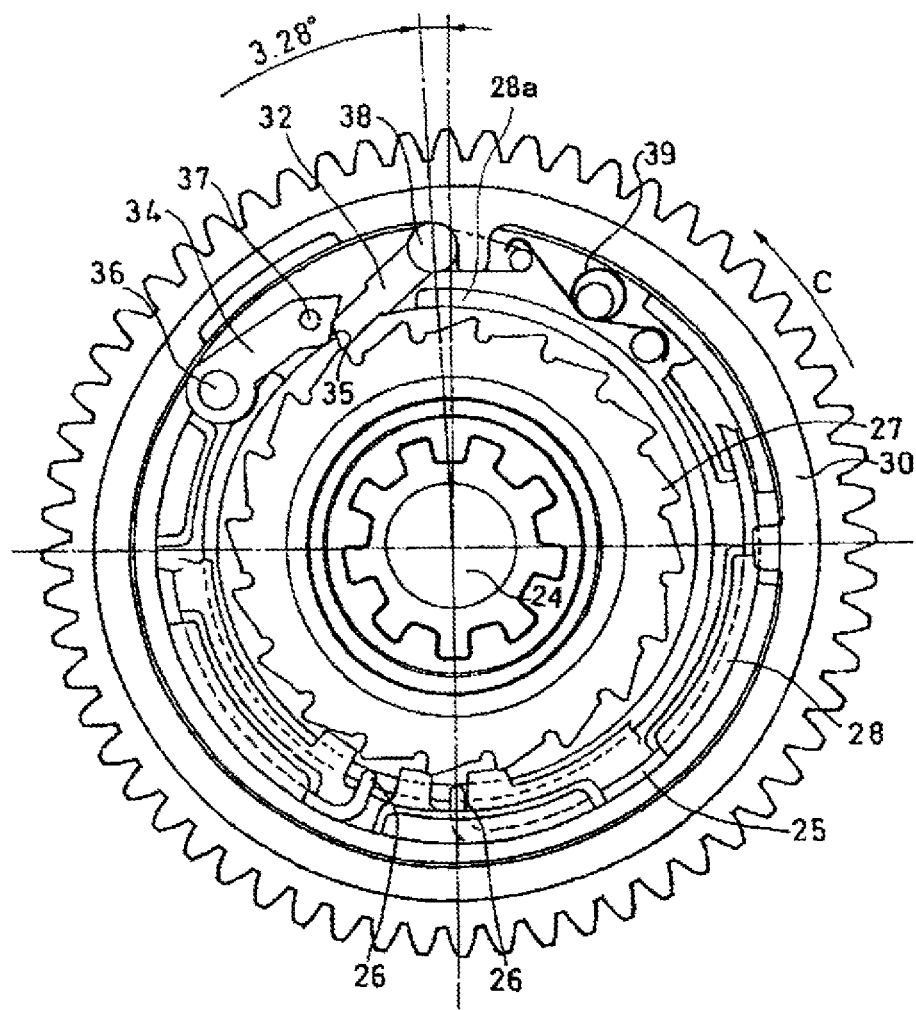
FIG. 5 is a vertical cross-section also generally taken along line BB in FIG. 1, and shows operation of the clutch that transmits motive power from the motor after rotation from the position seen in FIG. 4.

As shown in FIG. 5, when the motor 55 is rotated toward the wind-up side, the final gear 51 which couples with the rotational axle of the motor 55 rotates in the counter-clockwise direction (C direction). The pole 32 which is installed rotatably on the final gear 51 rotates toward the latch plate 27 over the cam surface 35 of the rotor cam 34 against the impelling force of the return spring 39, and starts to engage with the latch plate 27.

Figure 6:
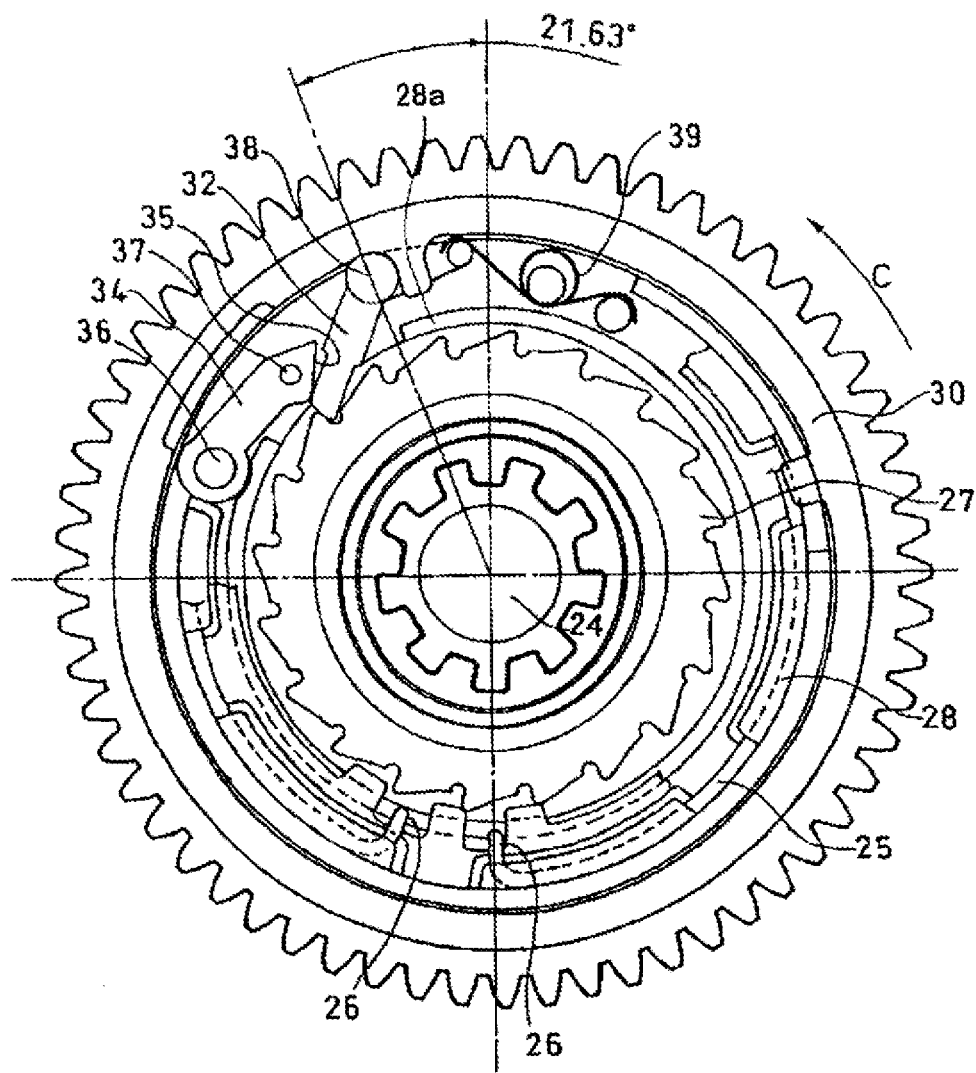
FIG. 6 is a vertical cross-section also generally taken along line BB in FIG. 1, and shows operation of the clutch that transmits motive power from the motor after further rotation from the position seen in FIG. 5.

As shown in FIG. 6, when the pole 32 engages with the latch plate 27, the rotation of the final gear 51 is transmitted to the spindle 11 via the latch plate 27 and starts to wind up the seatbelt 13. In this case, the rotor cam 34 performs a frictional sliding rotation over the friction spring 25, together with the clutch wheel 28.

Figure 7:
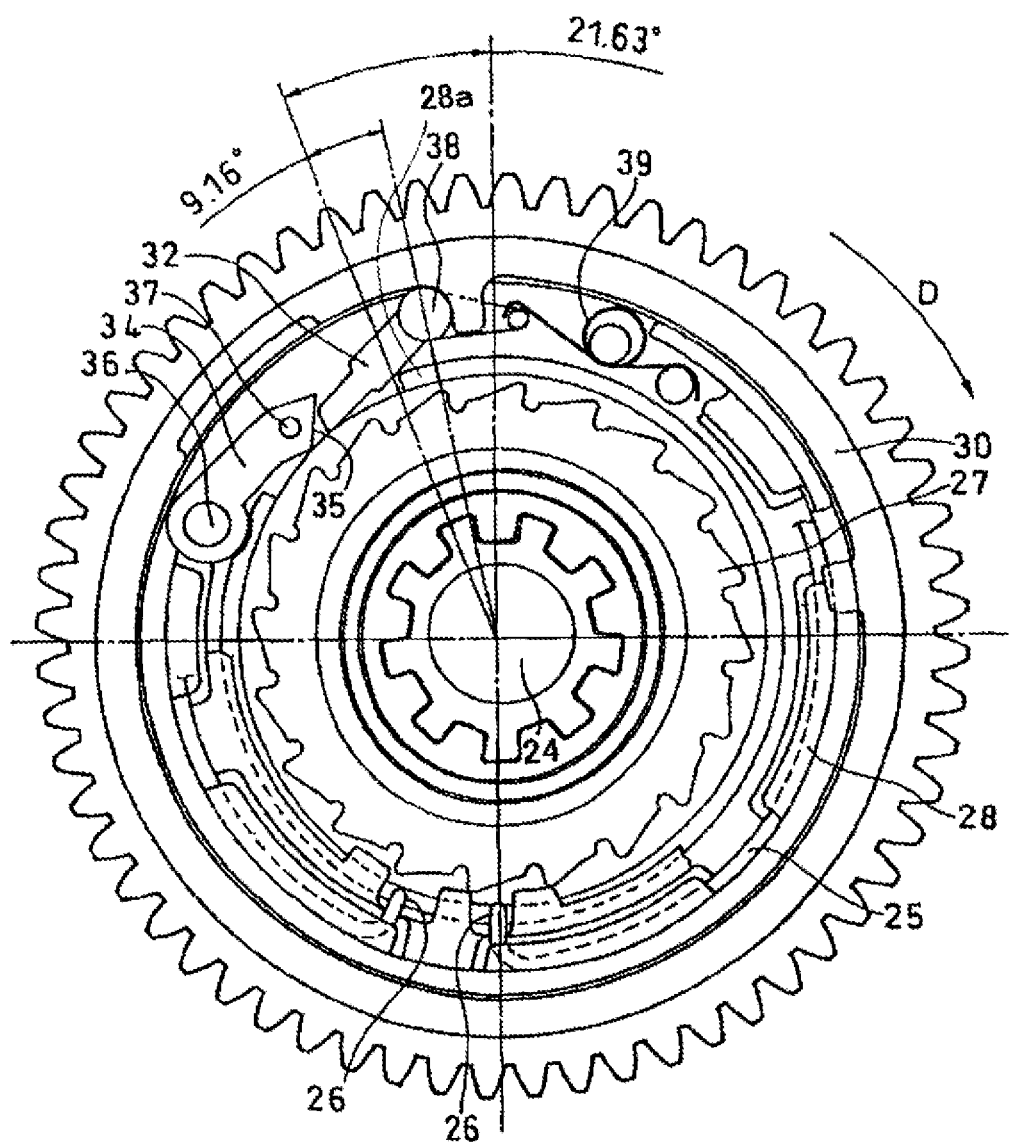
FIG. 7 is a vertical cross-section also taken generally along line BB in FIG. 1, and shows operation of the clutch that transmits motive power from the motor after a counter rotation from the position seen in FIG. 6.

As shown in FIG. 7, when the motor 55 rotates to the release side, the final gear 51 turns in the release direction (clockwise: D direction) in accordance with this rotation. The pole 32 rotates together with the final gear 51, but the clutch wheel 28 and the rotor cam 34 installed thereon remain in place due to the friction spring 25. The pole 32 is separated from the clutch plate 27 along the cam surface 35 of the rotor cam 34 by the impelling force of the return spring 39, and the pole 32 becomes disengaged from the latch plate 27.

Figure 8:
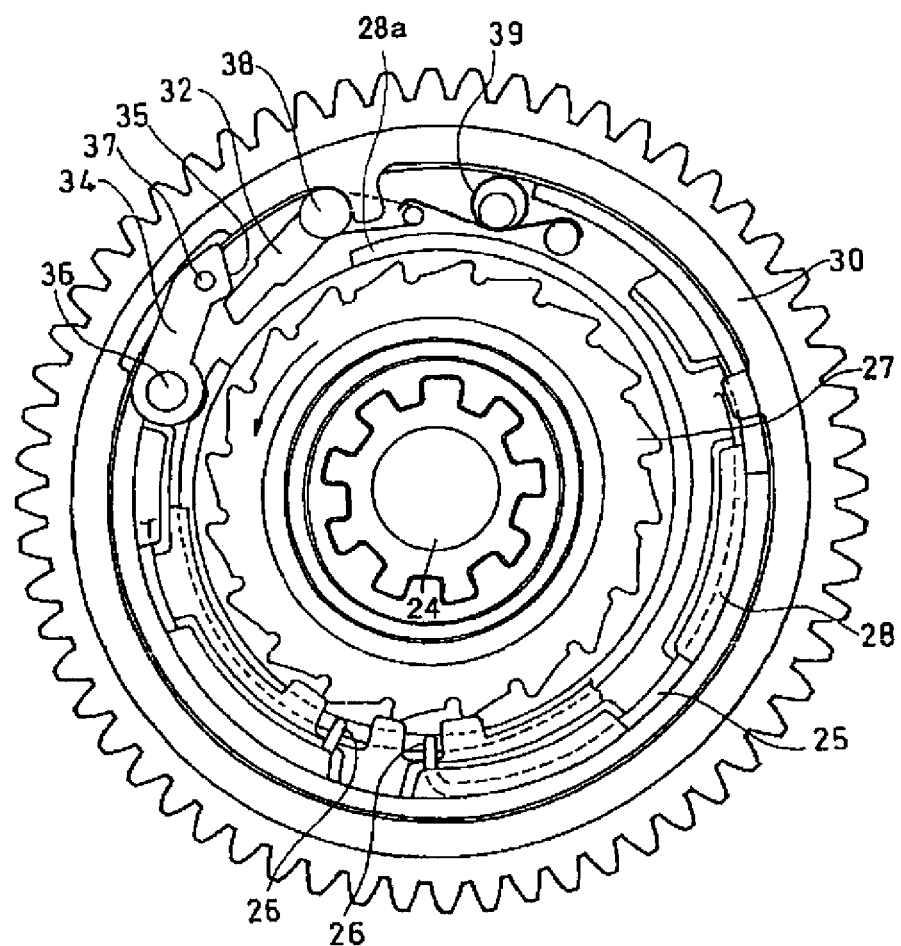
FIG. 8 is a vertical cross-section also generally taken along line BB in FIG. 1, and shows further operation of the clutch that transmits motive power from the motor.

As shown in FIG. 8, when the pre-tensioner 14 is operated, the pole 32 is made to spring outwards by the tooth surfaces of the latch plate 27, due to the high-speed wind-up rotation of the spindle 11 and the latch plate 27, which is integrated therewith. Simultaneously with this, the rotor cam 34 is pressed by the pole 32 and rotates in an outward direction about the axle 36 of the clutch wheel 28. By means of this rotational force, the fixing pin 37 of the clutch wheel 28 is sheared off. Consequently, the wheel 32 and the rotor cam 34 are held on the outer circumferential portion by the impelling force of the return spring, and thereafter, the motive power of the motor 55 is not transmitted to the spindle by the clutch 20.

Next, the operation of the torque limiter mechanism will be described.

In a normal state, as shown in FIG. 9(a), the large-diameter side gear 80 and the small-diameter side gear 82 of the third gear 73 are held in a mutually assembled state by means of the limit springs 81, and rotate in the same direction, namely, a wind-up direction as indicated by the solid arrows or a release direction as indicated by the dotted arrows. Here, in the case of winding by driving of the motor 55, if a torque differential larger than a prescribed torque occurs between the large-diameter side gear 80 and the small-diameter side gear 82, due to a light collision or braking in which the pre-tensioner 14 does not operate, then the shear pin 83b is sheared off, and the protruding sections 81a of the limit springs 81 are released from engagement with the engaging surfaces 80g and start to slide over the inner wall 80b while deforming elastically. By means of the protruding sections 81a engaging with the adjacent engaging surface 80g, a rotational deviation occurs between the large-diameter side gear 80 and the small-diameter side gear 82, and as shown in FIG. 9(b), the fourth gear 74 and the final gear 51 rotate in a direction pulling out the belt. As a result of this, the transmission of excessive torque by the motor 55 is suppressed, damage to the gear teeth can be prevented, and furthermore, the effects on the restraining performance in the event of an energy absorbing operation can be reduced. In this case, as shown by the belt tension graph in FIG. 11, the operational torque of the torque limiter mechanism becomes high only at the first peak where the shear pin 83b is sheared, and thereafter the operational torque is the torque at which the protruding sections 81a of the limit springs 81 ride over the projecting sections 80f. Therefore, it is possible to restrict increase in the overall operating torque during operation of the torque limiter.

As described above, in a seatbelt device 1 according to the principles of the present embodiment, the clutch 20 comprises a large-diameter side gear 80 to which motive power from the motor 55 is transmitted, a small-diameter side gear 82 which is provided on the spindle side, and limit springs 81 which are installed on the small-diameter side gear 82. An inner wall 80b having a plurality of engaging surfaces 80g capable of engaging the limit springs 81 is formed on the large-diameter side gear 80. According to the invention, The clutch 20 also comprises a torque limiter mechanism in which, when a torque differential greater than a prescribed operational torque has occurred between the large-diameter side gear 80 and the small-diameter side gear 82, the limit springs 81 are released from engagement with the engaging surfaces 80g and move relatively with respect to the large-diameter side gear 80, in such a manner that the torque difference becomes equal to or less than the prescribed operational torque. In this torque limiter mechanism, the prescribed operational torque which is set as the torque at which the limit springs 81 each move from the engaging surface 80g where they are positioned when the large-diameter side gear 80 and the small-diameter side gear 82 are in an assembled state, to the adjacent engaging surface 80g, when the motor 55 is driven to wind up, is greater than the operational torque at which the limit springs 81 move from the adjacent engaging surface 80g to the next adjacent engaging surface 80g. By this means, it is possible to prevent the torque limiter mechanism from operating due to inertia force when the gear rotates rapidly due to a wind-up force from the motor 55, while suppressing increase in the overall operational torque when the torque limiter operates.

Furthermore, a shear pin 83b is provided on the small-diameter side gear, and the prescribed operational torque which is set as the torque at which the limit springs 81 move from the engaging surface 80g where they are positioned in the assembled state to the adjacent engaging surface 80g includes the shear force at which the shear pin 83b is sheared when the large-diameter side gear 80 and the small-diameter side gear 82 move relatively, and therefore it is possible to apply a prescribed operational torque using a relatively simple composition.

Since a spring holder 83 for installing the limit springs 81 is fixed to the small-diameter side gear 82, and a shear pin 83b is provided on the spring holder 83 and is accommodated in the recess section 80h formed in the large-diameter side gear 80, then it is possible to shear the shear pin 83b easily, simply by changing the composition of the spring holder 83 and the large-diameter side gear 80.

Second Embodiment

Next, the seatbelt device relating to a second embodiment will be described with reference to FIGS. 12(a) to 12(c). The portions which are the same as the first embodiment are labeled with the same reference numerals and description thereof is omitted or simplified.

Figure 12:
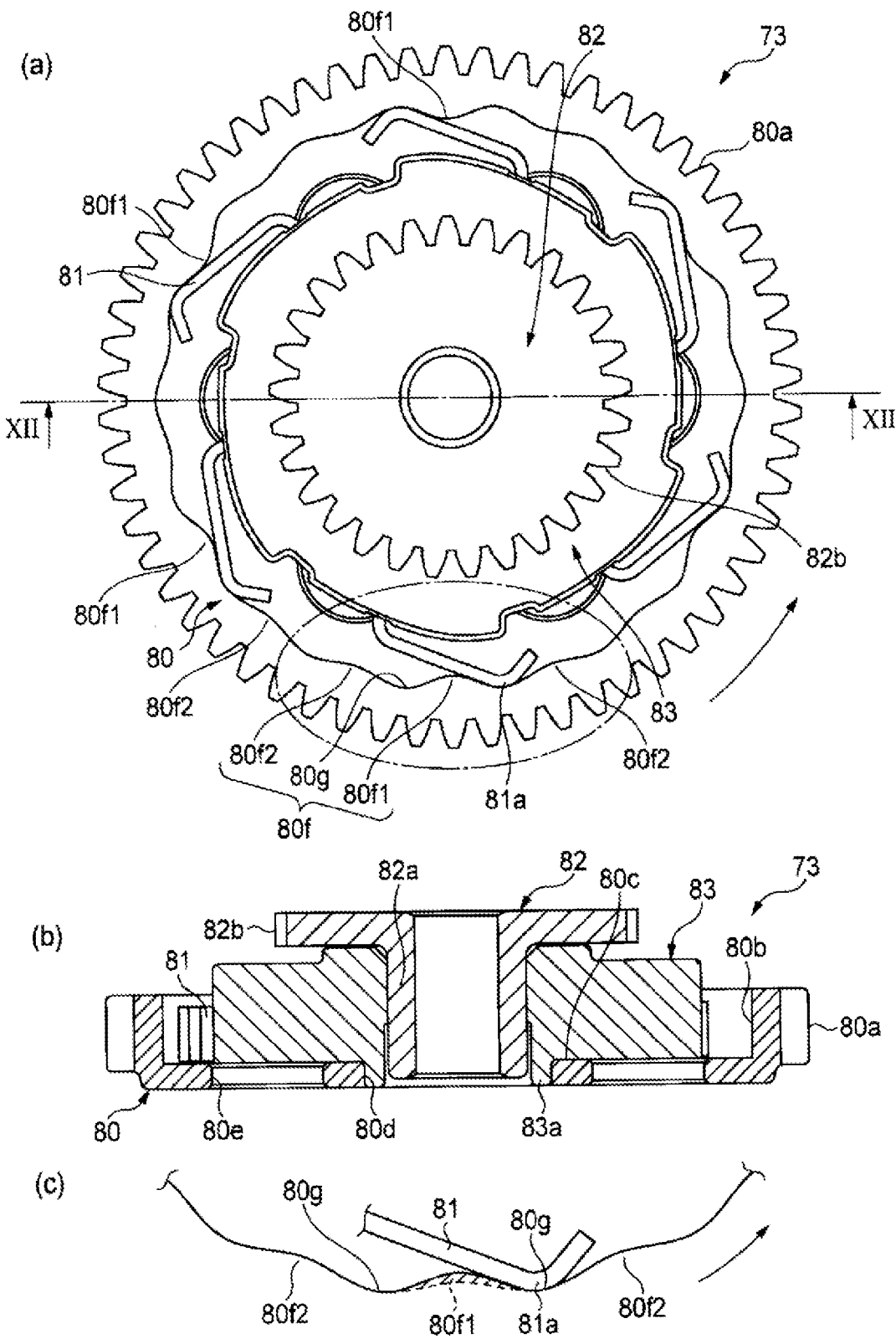
FIGS. 12(a) to 12(c) are diagrams illustrating a torque limiter mechanism according to a second embodiment.

As shown in FIG. 12(a) to FIG. 12(c), the torque limiter mechanism according to the present embodiment changes the operational torque of the torque limiter mechanism by changing the undulating shape of the inner wall 80b of the large-diameter side gear 80, rather than by providing a shear pin 83b.

In the inner wall 80b of the large-diameter side gear 80 according to the present embodiment, a plurality of projecting sections 80f are formed, the number of projecting sections 80f being an integral multiple of the number of protruding sections 81a of the limit springs 81. Among the plurality of projecting sections 80f, operation starting projecting sections 80f1 are of the same number as the limit springs (six in the present embodiment), which are positioned at equidistant intervals, are formed with a greater height than the height of the remaining projecting sections 80f2, in other words, the distance from the centre of the large-diameter side gear 80 is shorter than in the case of the remaining projecting sections 80f2. Therefore, when the limit springs 81 are assembled on the large-diameter side gear 80, the protruding sections 81a of the limit springs 81 are engaged with the engaging surfaces 80g that are positioned in the direction of rotation of the large-diameter side gear 80 with respect to the operation starting projection sections 80f1 projecting sections, in such a manner that during operation of the torque limiter mechanism the protruding sections 81a of the limit springs 81 firstly ride up over the operation starting projection sections 80f1. The number of operation starting projecting sections 80f1 may be less than the number of limit springs 81, and the operation starting projecting sections 80f1 may be formed in certain limit springs 81 only.

Therefore, according to the seatbelt device 1 of the present embodiment, a plurality of projecting sections 80f are formed between the plurality of engaging surfaces 80g, on the wall surface 80b of the large-diameter side gear 80. Among the plurality of projecting sections 80f, the operation starting projecting sections 80f1 which are positioned between the engaging surfaces 80g where the limit springs 81 are positioned in the assembled state and the adjacent engaging surfaces 80g, are formed to be higher than the projecting sections 80f2 that are positioned between the adjacent engaging surfaces 80g and the next adjacent engaging surfaces 80g. Consequently, it is possible to apply a prescribed operational torque simply by changing the shape of the inner wall 80b of the large-diameter side gear 80.

The remainder of the composition and action is similar to that of the first embodiment.

The present invention is not limited to the embodiments described above, and can be changed or modified appropriately.

The gear assembly 50 according to the present embodiment is desirably used in a seatbelt device equipped with a force transmission mechanism, but is not limited to this and can also be applied to a commonly known seatbelt device.

Furthermore, the limit springs 81 according to the present embodiment are installed on the large-diameter side gear 80, but may instead be installed on the small-diameter side gear 82, so as to engage with and disengage from engaging surfaces provided in the small-diameter side gear 82.

Moreover, the composition of the torque limiter mechanism according to the first embodiment and the composition of the torque limiter mechanism according to the second embodiment can also be used in combination.

The invention claimed is:

1. A seatbelt device, comprising:
a spindle upon which a seatbelt is wound up;
an electrical actuator configured to generate motive power for rotating the spindle; and
a power transmission mechanism configured to transmit motive power from the electrical actuator to the spindle,
wherein the power transmission mechanism includes:
an actuator side gear to which motive power from the electrical actuator is transmitted;
a spindle side gear provided on the spindle side; and
elastic pieces installed on one of the actuator side gear and the spindle side gear,
a wall surface having a plurality of engaging surfaces capable of engaging the elastic pieces and formed on the other of the actuator side gear and the spindle side gear,
a torque limiter mechanism is provided wherein, when a torque differential greater than a prescribed operational torque has occurred between the actuator side gear and the spindle side gear, each of the elastic pieces disengages from a first engaging surface of the plurality of engaging surfaces and moves relatively with respect to the other of the actuator side and spindle side gear such that the torque differential becomes equal to or lower than the prescribed operational torque, and wherein the prescribed operational torque is set as a torque at which each of the elastic pieces moves from the first engaging surface, where the elastic piece is positioned when the actuator side gear and the spindle side gear are in an assembled state, to an adjacent second engaging surface when the electrical actuator is driven to perform a wind-up operation, wherein the prescribed operational torque is greater than an operational torque at which the elastic piece moves from the adjacent second engaging surface to a next adjacent third engaging surface.

2. The seatbelt device according to claim 1, wherein a shearing member is provided in one of the actuator side gear and the spindle side gear, and the prescribed operational torque which is set as the torque at which the elastic piece moves from the first engaging surface where the elastic piece is positioned in the assembled state, to the adjacent second engaging surface, includes a shearing force at which the shearing member is sheared when the actuator side gear and the spindle side gear move relatively with respect to each other.

3. The seatbelt device according to claim 2, wherein an elastic piece holder for installing the elastic pieces is fixed to one of the actuator side gear and the spindle side gear, and the shearing member is provided on the elastic piece holder and is accommodated in a hole formed in the other gear.

4. A seatbelt device, comprising:

a spindle upon which a seatbelt is wound up;

an electrical actuator configured to generate motive power for rotating the spindle; and a power transmission mechanism configured to transmit motive power from the electrical actuator to the spindle, wherein the power transmission mechanism includes:

an actuator side gear to which motive power from the electrical actuator is transmitted;

a spindle side gear provided on the spindle side; and elastic pieces installed on one of the actuator side gear and the spindle side gear, a wall surface having a plurality of engaging surfaces capable of engaging the elastic pieces is formed on the other of the actuator side gear and the spindle side gear, a torque limiter mechanism is provided wherein, when a torque differential greater than a prescribed operational torque has occurred between the actuator side gear and the spindle side gear, each of the elastic pieces disengages from a first engaging surface of the plurality of engaging surfaces and moves relatively with respect to the other of the actuator side and spindle side gear such that the torque differential becomes equal to or lower than the prescribed operational torque, and wherein the prescribed operational torque is set as a torque at which each of the elastic pieces moves from the first engaging surface, where the elastic piece is positioned when the actuator side gear and the spindle side gear are in an assembled state, to an adjacent second engaging surface when the electrical actuator is driven to perform a wind-up operation, wherein the prescribed operational torque is greater than an operational torque at which the elastic piece moves from the second engaging surface to a next adjacent third engaging surface, wherein a plurality of projecting sections are formed between the plurality of engaging surfaces, on the wall surface of the other of the actuator side gear and the spindle side gear, and of the plurality of projecting sections, the projecting section which is positioned between the engaging surface where the elastic piece is positioned in the assembled state and the adjacent engaging surface is higher than the projecting section which is positioned between the adjacent engaging surface and the next adjacent engaging surface, the elastic piece first riding over the projecting section of higher height when the electrical actuator is driven to perform the wind-up operation.

* * * * *